J. G. MILLER.
WHEELED DIRT RECEPTACLE.
APPLICATION FILED SEPT. 22, 1911.
1,031,949.
Patented July 9, 1912.
2 SHEETS—SHEET 1.
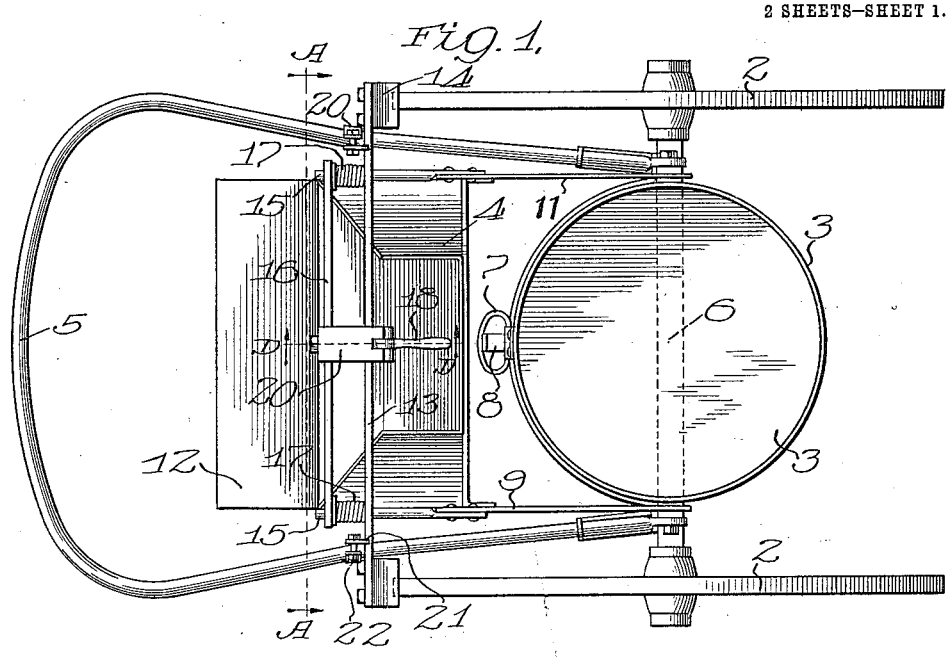
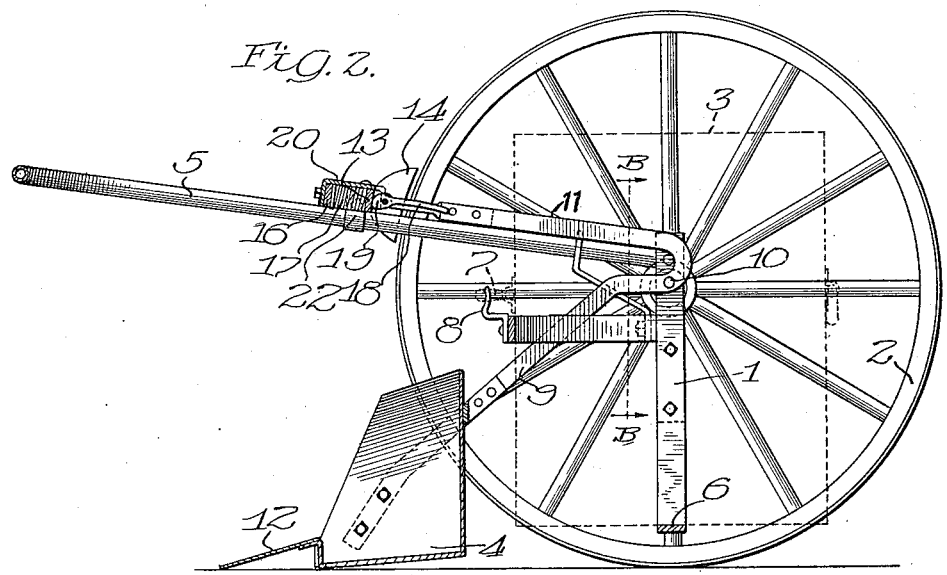
Witnesses:
G. T. Omarus Jr.
R. Burkhardt
Inventor:
John G. Miller
By: Rummler & Rummler
Attys.

J. G. MILLER.
WHEELED DIRT RECEPTACLE.
APPLICATION FILED SEPT. 22, 1911.

1,031,949.

Patented July 9, 1912.

2 SHEETS—SHEET 2.

UNITED STATES PATENT OFFICE.

JOHN G. MILLER, OF CHICAGO, ILLINOIS, ASSIGNOR TO THE BAKER MANUFACTURING COMPANY, OF CHICAGO, ILLINOIS, A CORPORATION OF ILLINOIS.

WHEELED DIRT-RECEPTACLE.

1,031,949.   Specification of Letters Patent.   Patented July 9, 1912.

Application filed September 22, 1911. Serial No. 650,858.

*To all whom it may concern:*

Be it known that I, JOHN G. MILLER, a citizen of the United States of America, and a resident of Chicago, county of Cook, State of Illinois, have invented certain new and useful Improvements in Wheeled Dirt-Receptacles, of which the following is a specification.

The main objects of this invention are to provide an improved construction for wheeled implements adapted to be used for receiving dirt and refuse from roads; to provide an improved method of mounting the dirt receiver and improved means for elevating it for discharging its contents into the receptacle; and to provide improved means for locking the receiver in position for collecting dirt.

An illustrative embodiment of this invention, as applied to a push cart, is shown in the accompanying drawings, in which—

Figure 1 is a plan view. Fig. 2 is a longitudinal sectional elevation, showing the dirt receiver in its lowered position. Fig. 3 is a similar view showing the dirt receiver in its elevated position for discharging its contents into the receptacle. Fig. 4 is a front view of a part of the mechanism by which the receiver is elevated and lowered, being viewed from the plane of the line A—A of Fig. 1. Fig. 5 is an enlarged fragmentary detail taken on the line B—B of Fig. 2. Fig. 6 is an enlarged sectional detail taken on the line C—C of Fig. 4. Fig. 7 is an enlarged sectional detail of the cam shifting mechanism, being taken on the line D—D of Fig. 1.

In the form shown in the drawings, the implement comprises a supporting frame 1, carried by wheels 2, a dirt receptacle 3, a dirt receiver 4, and a handle or draft appliance 5.

The dirt receptacle 3, which in the drawings is shown of cylindrical form, is supported on the frame 1, the base thereof resting upon the crosspiece 6 of the frame and the receptacle itself being secured against displacement by the connection of one of the handles 7 to the spring hook 8. The dirt pan or receiver 4 is rigidly secured in a second frame comprising a pair of V shaped members 9 pivotally connected at 10 to opposite sides of the frame 1 and adapted to elevate the receiver 4 so as to discharge its contents into the receptacle 3. The dirt receiver 4 is provided with an inclined lip or scraper 12, the edge of which is adapted to rest firmly upon the surface of the road so as to have the dirt brushed into the receiver 4 by means of a broom or other tool. The handle or draft appliance 5 is of substantially U shape and has its ends secured to the frame 1 independently of the members 9. Each of the V shaped members has one of its arms 11 located so as to normally extend along and substantially parallel with the adjacent arm of the draft appliance, while its other arm extends downward and is connected to the receiver.

The mechanism for elevating the dirt receiver 4 comprises the bar 13 extending across the arms 11 and having shoes 14 secured to each end thereof in position to respectively engage the peripheries of the wheels 2. The bar 13 is slidably mounted on the arms 11 of the members 9, and is provided with bolts 15 secured thereto and protruding through crosspiece 16, which connects the ends of the arms 11. Springs 17 encircle the bolts 15 and normally urge the bar 13 toward the wheels 2 so as to cause the shoes 14 to engage the peripheries of said wheels. While the device is being operated for receiving dirt, the shoes 14 on the bar 13 are held retracted from engagement with the wheels 2 by means of a lever 18 pivotally connected to the plane 20 and provided with a cam face 19. When the lever 18 is shifted to the position shown in Figs. 2 and 7, the cam 19 bears against the bar 13 and forces it back against the action of the springs 17.

The receiver 4 is locked in its lower position by reason of the bar 13 entering under shoulders 21, when it is retracted by the lever 18. The shoulders 21 are formed on clips 22 secured to the draft appliance 5 at opposite ends of the bar. When the bar 13 is released from the cam 19, it is also released from the shoulders 21.

The operation of the device shown is as follows:—When the dirt receiver is in its lowered position, as shown in Fig. 2, the implement is pushed forward along the ground by means of the draft appliance 5, to where the piles of dirt have been gathered. The lip 12 of the receiver is set in advance of a pile of dirt, which is then brushed into the receiver 4. When it is desired to empty the dirt receiver, the lever 18 is thrown upward so as to move the cam 19 out of engagement with the bar 13 and permit the springs 17 to release the bar from the shoulders 21 and permit the shoes 14 to engage the peripheries of the wheels 2. When the device is now pushed forward, the wheels rotate so as to lift the shoes 14 and thereby elevate the receiver 4 to a position above the receptacle 3. The shape of the pan of the receiver 4 is such that when swung to this position by its pivoted arms, it will discharge its contents into the receptacle. After the receiver has discharged its contents, the device is drawn backward on its wheels so as to lower the receiver to its normal position, and the lever 18 is pushed downward so as to cause the cam 19 to bear against the bar 13 and retract the shoes 14 from engagement with the peripheries of the wheels 2. This frees the wheels and allows the device to be pushed or pulled along freely, and it at the same time locks the receiver in fixed relation to the handle. When it is desired to remove the receptacle 3 for emptying its contents, the handle 7 is released from the hook 8 and the receptacle is then free to be lifted clear of the wheeled frame.

Although but one specific embodiment of this invention is herein shown and described, it will be understood that numerous details of the construction shown may be altered or omitted without departing from the spirit of this invention, as defined by the following claims.

I claim:—

1. In a device of the class described, the combination of a supporting frame adapted to be moved along the ground, a wheel having tractive contact with the ground, a dirt receiver, mechanism adapted to connect said wheel and receiver for elevating said receiver through the movement of said wheel along the ground, a draft appliance connected to said frame, and means shiftable to different positions for alternately locking said dirt receiver to said wheel and to said draft appliance.

2. A device of the class described, comprising a supporting frame, wheels journaled thereon, a dirt receptacle mounted on said frame, a second frame pivotally connected to said first frame, a dirt receiver carried by said second frame, a shoe carried by said second frame, means for shifting said shoe to engage one of said wheels whereby the rotation of such wheel will cause said receiver to be elevated for discharging its contents into said receptacle, and means adapted to retract said shoe from engagement with the wheel and simultaneously lock said member to said frame.

3. A device of the class described, comprising a supporting frame having supporting wheels, a draft appliance secured to said frame, a dirt receptacle mounted on said frame, a pair of members pivotally mounted at the sides of said frame and each having an arm extending downwardly and having another arm extending along said draft appliance, a dirt receiver secured to said downwardly extending arms, a bar slidably mounted on said other arms adjacent to the peripheries of said wheels, shoes on the ends of said bar, means normally urging said bar into position to cause said shoes to engage the peripheries of said wheels, and means adapted to hold said bar against the action of the first said means so as to retract said shoes from engagement with the peripheries of said wheels.

4. A device of the class described, comprising a supporting frame, wheels journaled thereon, a dirt receptacle mounted on said frame, a pair of members pivotally connected to said frame, a dirt receiver carried by said members, a bar slidably mounted on said members outwardly of the peripheries of said wheels, shoes carried by said bar, springs normally urging said bar to cause said shoes to respectively engage the peripheries of said wheels, and a lever having a cam adapted to engage said bar when said lever is operated for shifting the bar so as to retract said shoes from engagement with the peripheries of said wheels.

5. A device of the class described, comprising a supporting frame, wheels journaled thereon, a draft appliance secured to said frame, a dirt receptacle mounted on said frame, a pair of members pivotally connected to said frame, a dirt receiver carried by said members, a bar slidably mounted on said members outwardly of the peripheries of said wheels, shoes carried by said bar, springs normally urging said bar to cause said shoes to respectively engage the peripheries of said wheels, a lever having a cam adapted to engage said bar, when said lever is operated, for shifting the bar so as to retract said shoes from engagement with the peripheries of said wheels, and shoulders on said draft appliance adapted to engage said bar when shifted to its retracted position.

Signed at Chicago this 15th day of September 1911.

JOHN G. MILLER.

Witnesses:
M. G. BELLINGER,
B. WILLIAMS.

---

Copies of this patent may be obtained for five cents each, by addressing the "Commissioner of Patents, Washington, D. C."